April 4, 1944.  A. W. KATH  2,345,674
METHOD OF FORMING GELATINE SHEETS
Original Filed Dec. 30, 1938   6 Sheets-Sheet 4
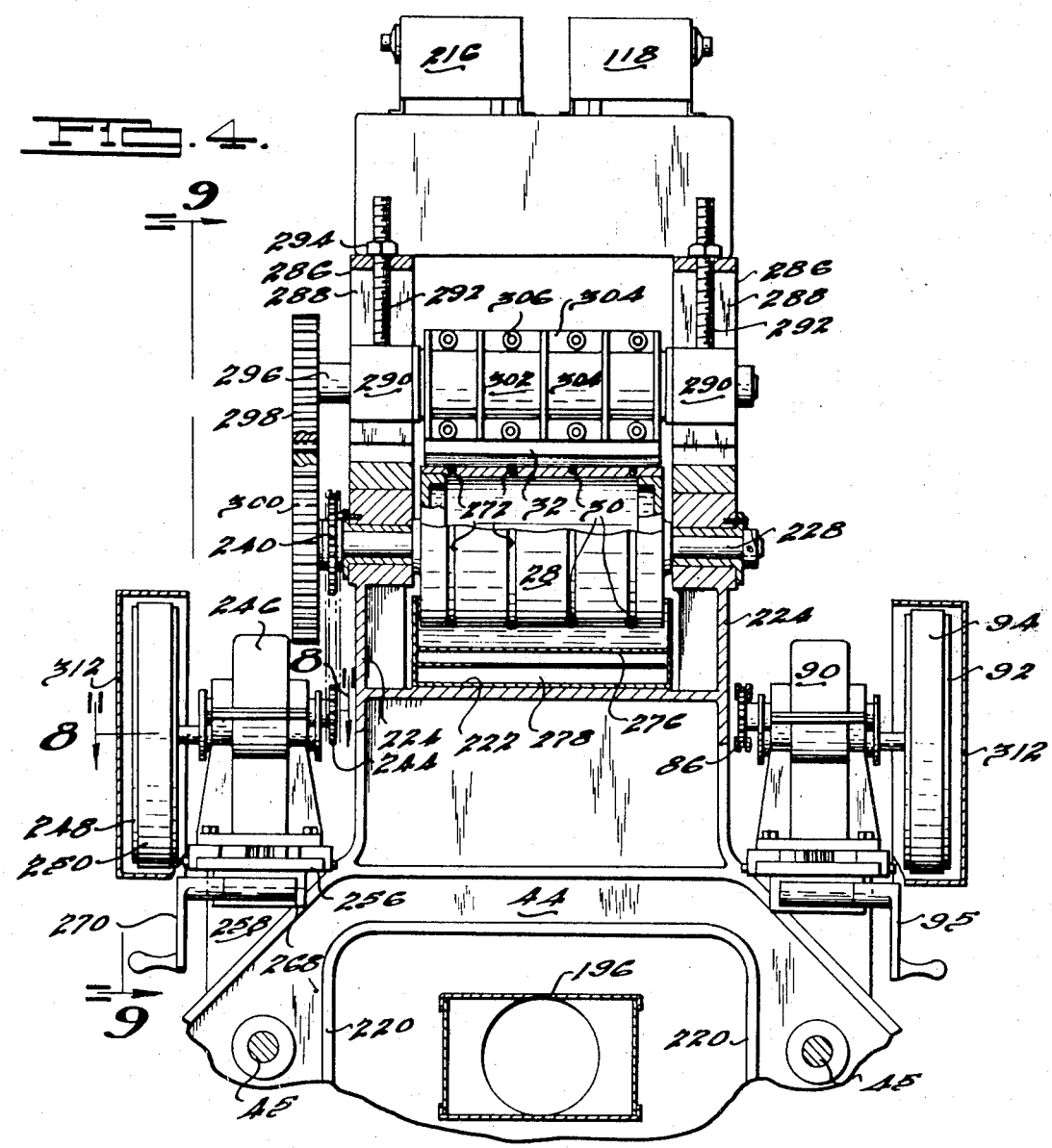
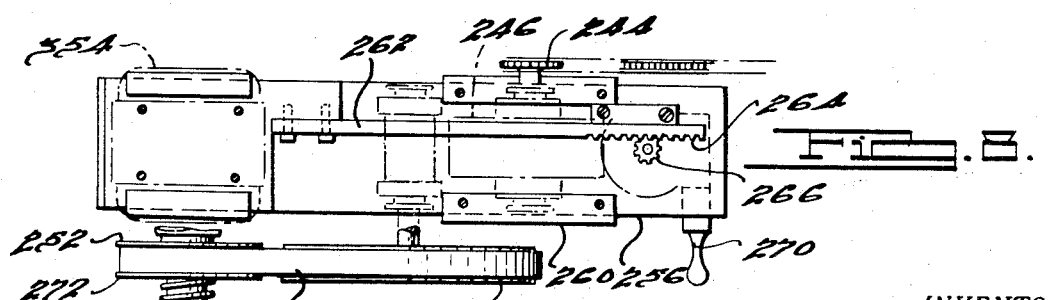
INVENTOR
Alfred W. Kath.
BY Barness, Dickey & Pierce
ATTORNEYS April 4, 1944.    A. W. KATH    2,345,674
METHOD OF FORMING GELATINE SHEETS
Original Filed Dec. 30, 1938    6 Sheets-Sheet 5

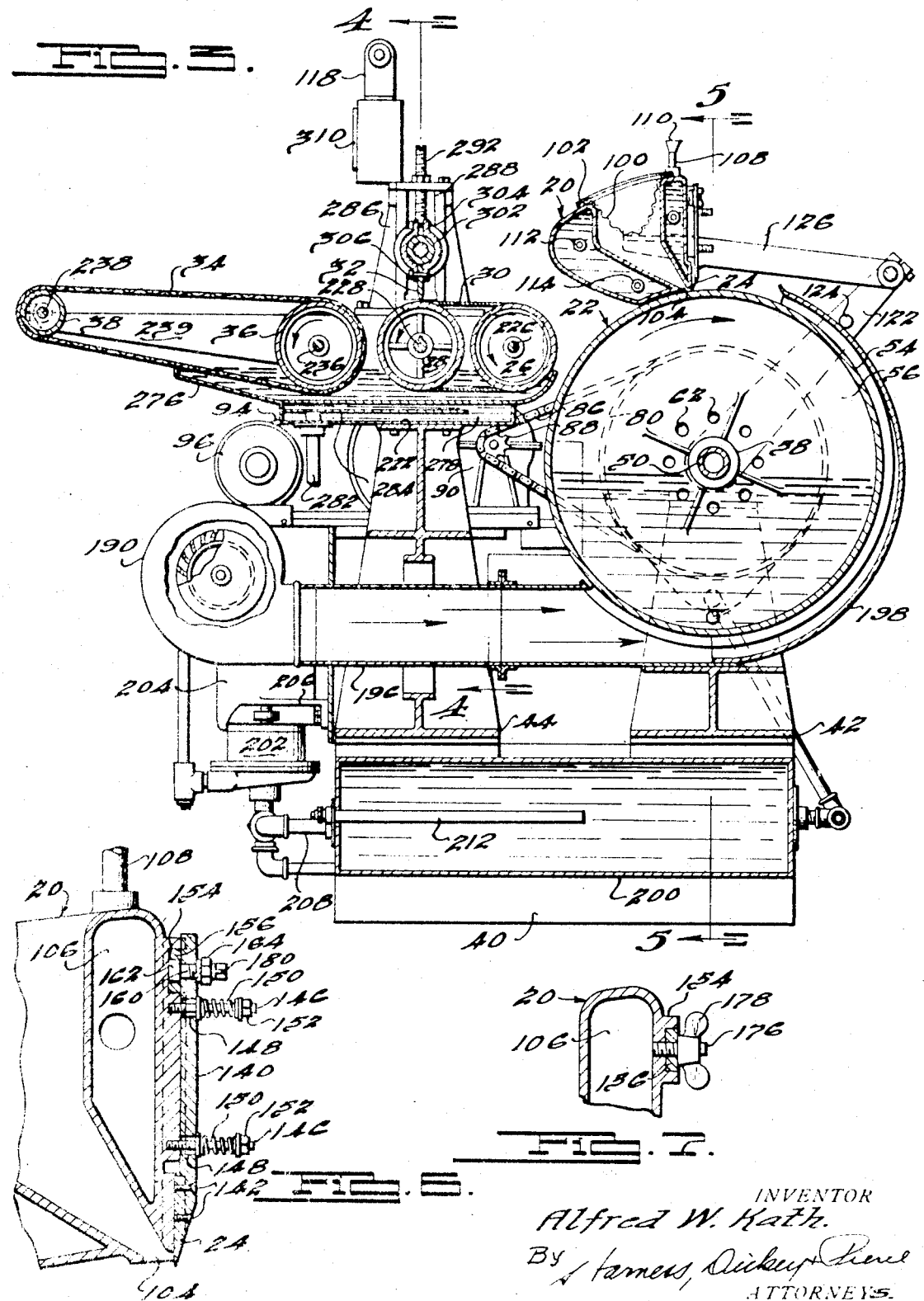

FIG.5.

INVENTOR
Alfred W. Kath.
BY Harness, Dickey & Pierce
ATTORNEYS.

April 4, 1944. A. W. KATH 2,345,674
METHOD OF FORMING GELATINE SHEETS
Original Filed Dec. 30, 1938 6 Sheets-Sheet 6
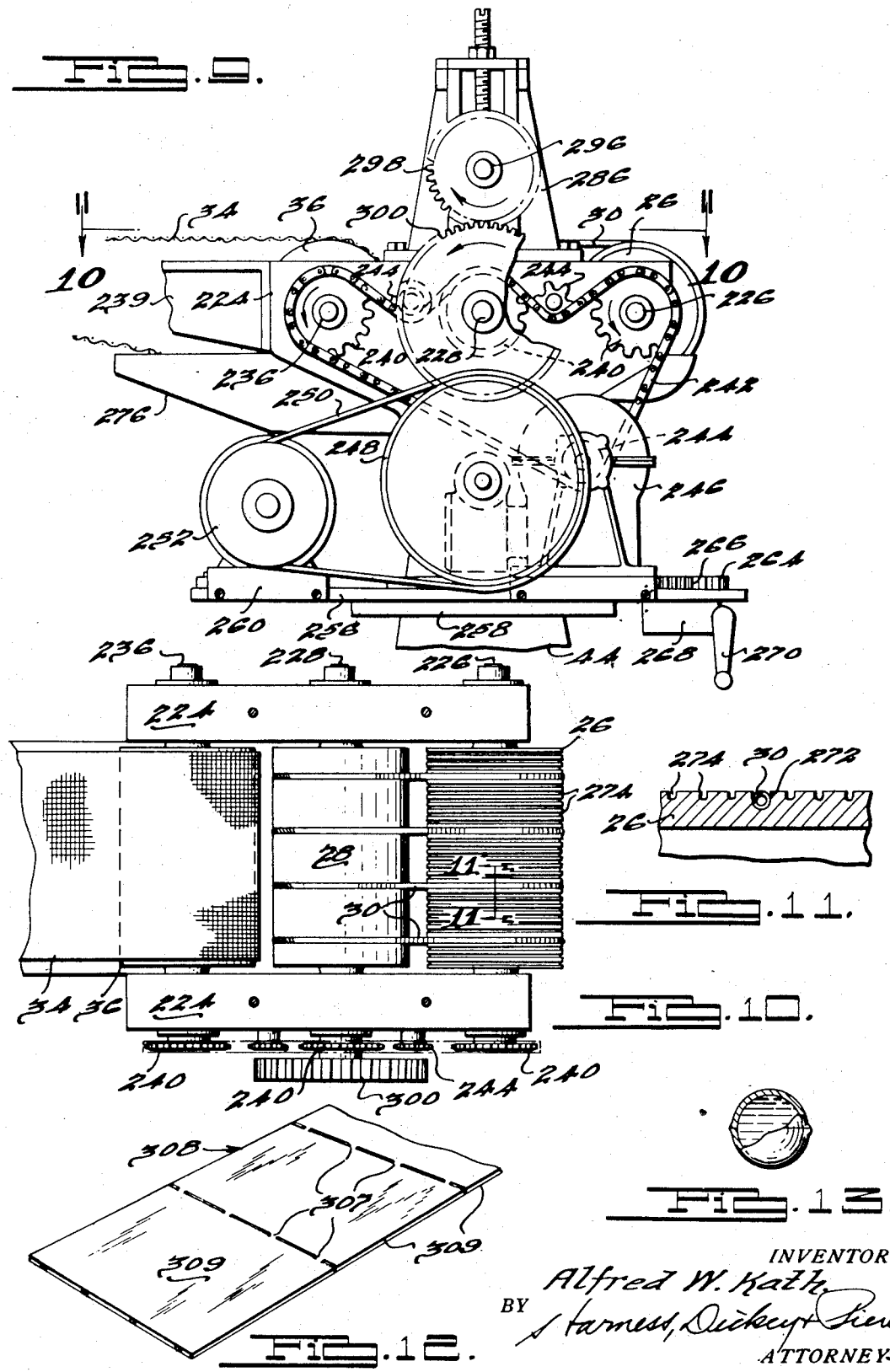

Patented Apr. 4, 1944

2,345,674

UNITED STATES PATENT OFFICE 2,345,674

METHOD OF FORMING GELATIN SHEETS

Alfred W. Kath, Detroit, Mich., assignor to Arthur Colton Company, Detroit, Mich., a corporation of Michigan Original application December 30, 1938, Serial No. 248,482. Divided and this application April 10, 1942, Serial No. 438,361

4 Claims. (Cl. 18—57)

This invention relates to a method of forming gelatin ribbons, sheets and leaves and is a division of my application for Letters Patent of the United States for improvements in Mechanism for forming gelatin sheets, filed December 30, 1938, and serially numbered 248,482.

Objects of the invention include the provision of a method of forming gelatin sheets including the steps of applying liquid gelatin to a moving surface, maintaining said surface at a temperature above room temperature whereby to maintain the contacting surface of the gelatin in a tacky condition, and skin drying the opposite surface of such gelatin; the provision of a method of forming gelatin sheets as above described in which the moving surface comprises a drum, and a liquid above room temperature is circulated through the drum in contact with the peripheral wall thereof; the provision of a method as above described in which air is circulated over the exterior surface of the gelatin while in contact with the drum to effect the skin drying of such outer surface only; and the provision of a method as above described in which the gelatin is stripped from the drum and severed transversely of its length to form sheets, the severance being of an interrupted character whereby to provide spaced tongues of gelatin connecting adjacent sheets, the sheets are separated from one another whereby to stretch such tongues without rupturing them, and finally the tongues are severed, the sheets arranged in superposed pairs with the tacky surfaces thereof opposed and provided with a liquid fill between them, and such sheets as last arranged are then acted upon to form a plurality of liquid filled capsules.

The above being among the objects of the present invention, the same consists in certain novel steps of operation to be hereinafter described with reference to the accompanying drawings, and then claimed, having the above and other objects in view.

In the accompanying drawings which illustrate an illustrative embodiment of apparatus suitable for use in carrying out the present invention and in which like numerals refer to like parts throughout the several different views, Figs. 1 and 2 are three-quarter perspective views taken from the discharge end of a machine embodying the present invention and from the right and lefthand sides thereof, respectively;

Fig. 3 is a partially broken vertical sectional view taken centrally and longitudinally of the machine shown in Figs. 1 and 2;

Fig. 4 (sheet 4) is an enlarged fragmentary vertical sectional view taken on the line 4—4 of Fig. 3;

Fig. 5 (sheet 5) is an enlarged vertical transverse sectional view taken on the line 5—5 of Fig. 3;

Fig. 6 (sheet 3) is an enlarged fragmentary vertical view taken on the line 6—6 of Fig. 5 and illustrating in greater detail the construction of the spreader box and spreader gate;

Fig. 7 (sheet 3) is an enlarged fragmentary, sectional view taken on the line 7—7 of Fig. 5;

Fig. 8 (sheet 4) is a more or less diagrammatic plan view taken on the line 8—8 of Fig. 4 and illustrating in greater detail the variable drive mechanism for one of the machine units;

Fig. 9 (sheet 6) is a more or less diagrammatic fragmentary side elevational view taken on the line 9—9 of Fig. 4, illustrating the drive mechanism for one of the units of the machine;

Fig. 10 (sheet 6) is a fragmentary plan view taken on the line 10—10 of Fig. 9;

Fig. 11 (sheet 6) is an enlarged fragmentary sectional view taken on the line 11—11 of Fig. 10;

Fig. 12 is a fragmentary perspective view of one of the sheets or ribbons of gelatin such as is produced by the machine shown in the preceding views;

Fig. 13 (sheet 6) is a partially broken view of a gelatin capsule such as the sheet shown in Fig. 12 is employed to produce.

Figure 1:
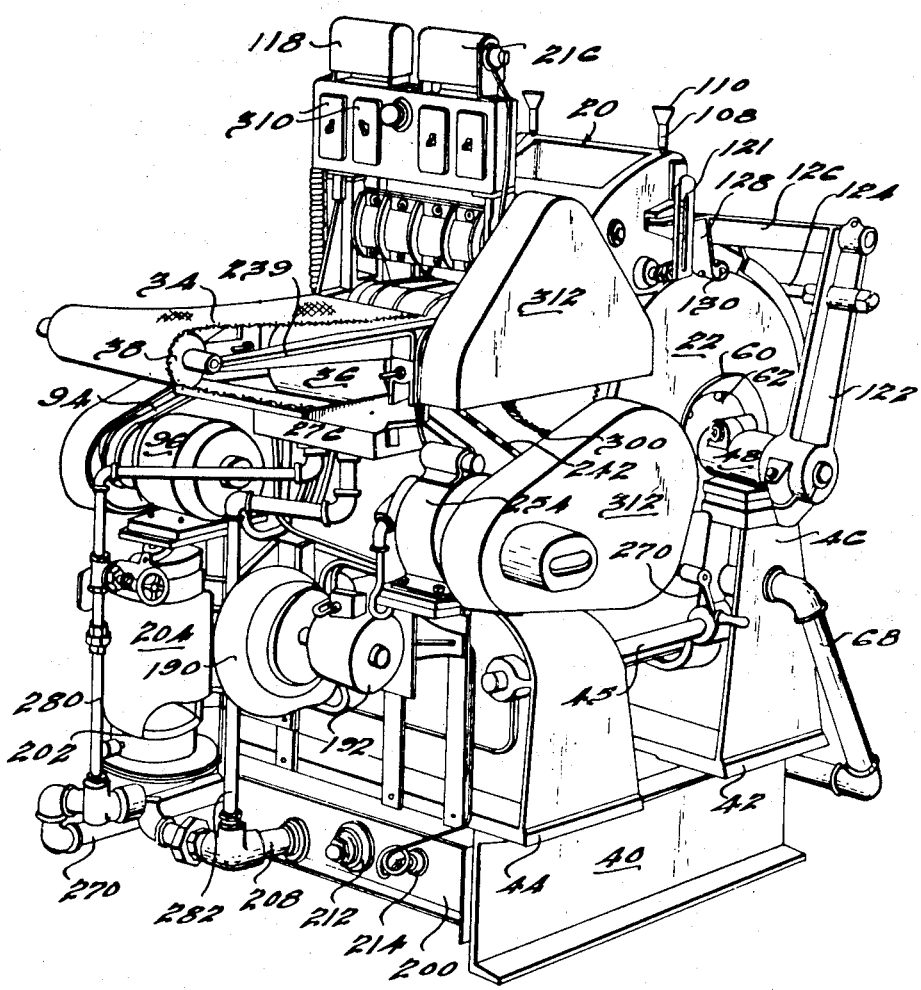

It is, of course, old practice to form gelatin sheets, ribbons or leaves by depositing a film of liquid gelatin upon the surface of a drum, there to be solidified, moved and cut up into suitable sizes for use. Where such gelatin sheets or leaves are to be employed in the manufacture of liquid filled capsules, such as shown in Fig. 13 (conventionally accomplished by confining a suitable amount of oil or other medicinal agent between a pair of opposed gelatin sheets and then subjecting the filled sheets to a pressing operation between a pair of suitably formed dies), many problems and conditions arise which are not satisfactorily taken care of by heretofore existing equipment. For instance, in order to facilitate the handling of such sheets in the manufacture of liquid filled capsules, it is necessary that that side of a sheet which comes into contact with the surfaces of the dies and of other objects from the time the sheets leave the forming drum until they have been formed into the capsules, be sufficiently hard or dry so as to prevent them from sticking to such surfaces. At the same time the opposite side of such sheet preferably is of a tacky nature so as to facilitate the welding of a pair of such sheets together about the diameter of each of the capsules formed therefrom and to insure maintenance of a fluid tight joint at the line of connection between the two halves of the capsule. The machine designed in accordance with the present invention is capable of providing such gelatin ribbons, sheets or leaves at an unusually constant thickness and the finally discharged product is that having the characteristics above noted rendering it particularly suitable for the production of liquid filled gelatin capsules. In the attainment of these results it will be appreciated that a machine designed in accordance with the present invention involves numerous novel and useful features necessary to the attainment of the above and other desirable results.

Referring to the accompanying drawings and particularly to Fig. 3 (sheet 3) a machine will be seen to include a gelatin spreader box indicated generally at 20 adapted to discharge liquid gelatin upon the surface of a roll or drum indicated generally at 22 rotating in the direction of the arrow, the thickness of the layer of gelatin thus being deposited upon the surface of the drum 22 being controlled by means of a gate 24. The gelatin sheet, after making almost a complete turn with the drum 22, is stripped off of the drum and is led over a roll 26. A roll 28 positioned in spaced and parallel relation with respect to the roll 26 is connected thereto by means of a belt formed of a plurality of garter springs 30 trained around the peripheries of the rolls 26 and 28 and which belt forms a means for conveying the gelatin strips from the roll 26 to the roll 28 and discharging it beyond the same. Where it is desired to cut the ribbon thus delivered from the drum 22 into a plurality of sheets or leaves of predetermined length, a rotary knife 32 is provided in cooperation with the roll 28 to effect the desired result. The ribbons or sheets discharged from the roll 28 are preferably conducted to a delivery belt 34 trained over a pair of suitably spaced and parallel rolls 36 and 38 so as to deliver the ribbons or sheets to a desired point of discharge.

Referring now particularly to Figs. 1, 2, 3 and 5, it will be noted that the machine shown is provided with a supporting base consisting of a pair of spaced parallel channels 40 arranged in back-to-back relationship and with the flanges thereof arranged horizontally. At one end of the channel 40 a cast supporting member 42 is rigidly fixed thereto for supporting the drum 22 and associated parts, and at the opposite end of the channels 40 a cast supporting member 44 is rigidly fixed thereto for supporting rolls 26 and 28, 36 and 38 and associated parts. Bars 45 may be provided for rigidly interconnecting the members 42 and 44, if desired.

Referring now particularly to Fig. 5 (sheet 6), it will be noted that the member 42 at each side thereof is provided with a pillar 46 to the upper ends of each of which is suitably fixed a member 48 which members non-rotatably support between them the hollow shaft 50. The drum 22 is rotatably supported upon the shaft 50 between the members 48 and its hubs are provided with bushings 52 in engagement with the shaft 50. The drum 22 is shown of built up construction including a circumferential wall 54 and separately formed end walls 56 suitably secured thereto as by welding. Hub sleeves 58 are welded into the end walls 56 centrally thereof for reception of shaft 50 and rollers 52. Each end wall 56 has fixed thereto as by welding centrally thereof and on the outer side thereof a frusto-conical skirt 60 which flares both axially and radially outwardly from their point of connection with such end walls. The small ends of the skirt 60 are of considerably larger diameter than the hub sleeves 58 and a plurality of openings 62 are drilled through each end wall 56 between the point of connection of the corresponding skirt member 60 and hub sleeve 58 therewith.

The holes 62 are for the discharge of water or other fluid medium from the interior of the drum 22 and for this purpose each of the pillars 46 on the inner side thereof is provided with a semi-circular trough 64, the inner wall of which axially inwardly overlaps the lower outer edge of the corresponding skirt member 60 so as to insure water discharging from the skirt 60 being deposited in the corresponding trough 64. Each pillar 46 is provided with a cored passage 66 therein communicating with the bottom of the corresponding trough 64 and connected with suitable drain pipes 68 for conducting the water overflowing from the interior of the drum 22 through the holes 62 to a suitable point of deposit which will hereinafter be more fully explained. For the purpose of enabling the drum 22 to be substantially completely drained of water, a conventional screw plug 70 is preferably provided in one of the end walls 56 thereof adjacent the periphery thereof.

In order to lock the shaft 50 against rotation in the members 48, each of the members 48 is slotted radially adjacent one end thereof and provided with a cooperating bolt 72 for contracting the slotted end about the shaft 50 to thereby clamp it in position. As best illustrated in Fig. 5, one end of the shaft 50, shown as the lefthand end, is provided with a conventional screw plug 74 for closing such end of the shaft. The opposite end of the shaft is provided with a suitable pipe fitting 76 through which it is adapted to be connected to a suitable source of water or other liquid supply which flows into the hollow interior of the shaft 50 and is discharged therefrom into the interior of the drum through a plurality of holes 78 extending through the walls of the shaft 50 between the hub shells 58. The fitting 76 preferably is provided with a thermometer, indicated generally at 79, for the purpose of enabling the temperature of the water flowing to the interior of the drum to be accurately checked.

In order to drive the drum 22, and as best illustrated in Figs. 2, 3, 4 and 5, an annular sprocket 80 mounted upon a ring 82 is secured to the exterior face of one of the drum heads 56 in concentric relation therewith by means of bolts 84. A chain 86 trained over the sprocket 80 is also trained over a small sprocket 88 mounted upon and driven by a conventional form of gear reduction mechanism 90 suitably mounted upon the support 44. The gear reduction mechanism 90 is provided with a drive pulley 92 driven by means of a so-called V-belt 94 from a motor 96 (see Figs. 2 and 3).

Figure 2:
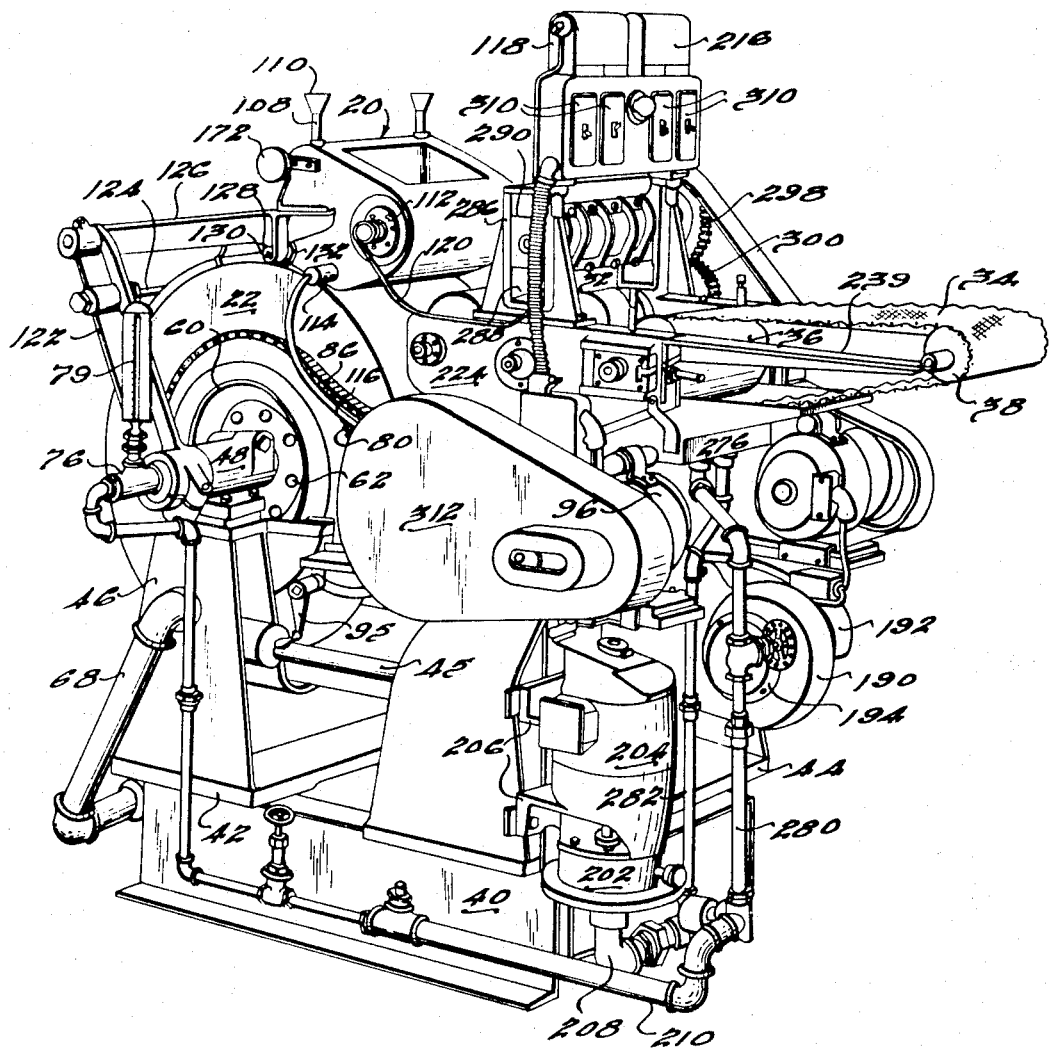

The spreader box 20, as best indicated in Figs. 1, 2 and 3, is positioned adjacent the highest point of the drum 22 and its open top is preferably provided with a strainer screen 100 therein (see Fig. 3) supported by a suitable frame 102 for the purpose of preventing any solid particles from becoming lodged in the spreader box. It will also be appreciated from an inspection of Figs. 1 and 2 that the spreader box 20 extends almost the full width of the drum 22. As best indicated in Figs. 3 and 6, the bottom walls of the gelatin containing recess in the spreader box 20 converge toward one another and in the direction of rotation of the drum 22 so as to provide a discharge opening or spout 104 terminating immediately above the upper surface of the drum 22 and extending across the same in axially parallel relation thereto. The walls of the spreader box 20 are hollow so as to form a chamber 106 completely surrounding the spreader box except at its top and this chamber serves to provide a water jacket for the spreader box whereby the contents may be maintained at a desired temperature. For the purpose of filling the chamber 106 with water or other suitable liquid, a pair of short pipes 108 are provided at the top of the spreader box and communicate with the chamber 106, the upper ends of the pipes 108 being provided with flared or funnel-like mouths 110 to facilitate the pouring of liquid thereinto. An electrical heating element 114 is projected through a side of the spreader box 20 into the liquid filled chamber 106 thereof and a thermostat 112 similarly projected through a side of the spreader box and into the chamber 106. The thermostat 112 is provided with a connection 120 leading to an adjustable control box 118 mounted on top of the machine, as best indicated in Figs. 1 and 2, and the electrical heating element 114 is provided with a lead 116 which receives its source of current from the control box 118 as governed thereby. A thermometer 121 (see Fig. 1) is preferably provided in connection with the spreader box 20 so as to enable the temperature of the liquid in the chamber 106 to be accurately checked. This temperature may be maintained at approximately 106° F. as a matter of illustration.

For the purpose of supporting the spreader box 20, a radially directed arm 122 is rigidly clamped to the axially outwardly projecting end of each member 48. As indicated in Fig. 3, the arms 122 are inclined upwardly and outwardly with respect to the corresponding end of the machine and at a point radially outwardly beyond the periphery of the drum 22 the arms 122 are rigidly interconnected by means of a cross-bar 124. Pivotally secured to the free end of each of the arms 122 is the forward end of a rearwardly extending arm 126. The arms 126 are laterally spaced from one another by a distance corresponding to the width of the spreader box 20 which is received between the rear ends of these arms and is rigidly fixed thereto. Each of the arms 126 adjacent the rear end thereof, and as best illustrated in Fig. 2, is provided with a downwardly projecting boss 128 carrying a short shaft or pin 130 in parallel relation with respect to the axis of the drum 22 and on the inner end of which a roller 132 is rotatably mounted, the rollers 132 bearing against the axially outer marginal edges of the peripheral surface of the drum 22 and thereby definitely locating the spreader box gate 24 with respect to the periphery of the drum 22. By this means the distance which the spreader box gate 24 is spaced from the peripheral surface of the drum 22, and consequently the thickness of the sheet or ribbon of gelatin to be formed is controlled from the surface of the drum 22. This obviates the disadvantage of conventional types of similar machines in which the spreader box and gate are supported from a fixed part of the machine and, accordingly, in which any variations in the peripheral surface of the cooperating drum will consequently cause variations in the thickness of the sheet or ribbon of gelatin being formed. In this respect it may be noted that it is practically impossible to maintain the surface of a drum such as 22 in accurately cylindrical conformation at all times due to the fact that changes in temperature, relieving of strains, etc., in the drum cause the drum to warp or spring at various points in its surface which inaccuracies result in conventional constructions in variations of sheet or ribbon thicknesses, but in the present case because of the manner in which the spreader box and gate are supported, these defects and particularly an out-of-round condition of the drum 22 can have little if any effect on the desired thickness of the final product.

Means are provided, as best illustrated in Figs. 3, 4, 6 and 7, for mounting the spreader box gate 24 upon the spreader box 20 and enabling quick and accurate adjustment of the distance between the effective edge of the cutter bar gate and the surface of the drum 22. To this end a pair of upwardly extending bars 140, preferably of rectangular section as shown, are secured at their lower end to the spreader box gate 24 as by means of screws 142. The forward face of the spreader box, as best indicated in Fig. 5, is provided with a pair of laterally spaced guideways 144 for receiving the bars 140 and accurately guiding them for vertical movement therein. As best indicated in Fig. 6, a pair of vertically spaced studs 146 are threaded into the spreader box 20 centrally of each guideway 144 and project outwardly therefrom through vertically elongated slots 148 provided in each arm 140 for reception thereof. Coil springs 150 surrounding each stud 146 outwardly of the corresponding bar 140 are maintained under compression between the corresponding bar 140 and a nut 152 threaded upon the outer end of each stud. By this means the bars 140 are resiliently maintained in contact with the cooperating guideways 144 and are permitted a limited amount of vertical movement, together with the spreader box gate 24, within the confines of the slots 148.

The forward face of the spreader box 20, as best indicated in Figs. 5 and 6, is also provided with a horizontal guideway 154 extending transversely across the tops of the guideways 144. Slidably received within the guideway 154 is a transversely slidable bar 156 lying inwardly or back of the upper ends of the bars 140. In line with each bar 140 the bar 156 is provided with an angularly extending slot 158 the walls of which serve as cam surfaces. Each guide bar 140 in line with its corresponding slot 158 is provided with a screw element 160 projecting therethrough and having on its inner side a cylindrical head 162 received in the corresponding slot 158 and of a diameter to be accurately received between the opposite side walls of such slot. A nut 164 threaded upon the outer end of each screw element 160 serves to clamp the screw element 160 securely in place and against rotation on the bar member 140. One end of the bar member 156 is provided with a forwardly projecting lug 166, as best indicated in Fig. 5, and an axially fixed but rotatable screw 168 is mounted in an arm 170 secured to one end of the spreader box 20 and is threadably received in the lug 166. The screw 168 is provided with an operating knob 172 by means of which the screw 168 may be rotated and in rotating cause the bar 156 to be moved either to the right or left in the guideway 154 as viewed in Fig. 5. As will be appreciated, movement of the bar 156 to the right, as viewed in Fig. 5, cooperating through the screw element 160 and bars 140 will cause the spreader box gate 24 to move away from the surface of the drum 22 whereas rotation of the screw 168 to move the bar 156 to the left will cause the gate 24 to more closely approach the surface of the drum 22, and because of the relationship of the parts the gate 24 will be maintained in parallel relation with respect to the surface of the drum 22 during such movement.

In order to effectively lock the gate 24 in its vertically adjusted position the bar 156 centrally thereof is provided with a longitudinally extending slot 174 therethrough. As best indicated in Fig. 7, a stud 176 in the outer wall of the spreader box 20 projects outwardly through the slot 174 and receives a wing nut 178 upon its outer end by the tightening of which longitudinal movement of the bar 156 may be effectively prevented thus to lock the gate 24 in its vertically adjusted position.

Again referring to Figs. 5 and 6 and particularly to Fig. 6, in order to provide an initial adjustment between the operative edge of the gate 24 and the surface of the drum 22 so as to insure equal spacing of the operative edge of the gate 24 with respect to the surface of the drum over its entire length, the cylindrical heads 162 on the screw elements 160 are located in eccentric relation with respect to the axis of the screw element 160 and the outer ends of the screw elements 160 are squared as at 180 for reception of a wrench so as to enable them to be readily rotated. Accordingly, if it is desired to adjust one end of the gate 24 relative to the opposite end thereof and with respect to the surface of the drum 22, the corresponding nut 164 is loosened, a wrench is applied to the end 180 of the screw element 160, and the element is turned so as to raise or lower the corresponding bar 140 and consequently the corresponding end of the gate 24 the desired distance, by reason of the camming action of the head 162 in the cooperating slot 168, upon which the nut 164 is again tightened to lock these parts in their thus adjusted position.

As previously mentioned, particularly where the sheets of gelatin formed by the machine are to be employed in the production of liquid filled capsules, it is desirable that one surface of the sheet is provided with a more or less non-sticky skin and the opposite face of the sheets is maintained in more or less tacky condition. In order to provide one side of the sheet formed on the drum 22 with such a non-sticking skin, means are provided for blowing air over the outer surface of the sheet formed on the drum 22. For this purpose a fan, indicated generally at 190, is mounted at the discharge end of the machine and, as best indicated in Fig. 1, is provided with an electric motor 192 for driving the same. The inlet port 194 for the fan 190 (see Fig. 2) may be allowed to be open to the atmosphere in the room in which the machine is located or it may be connected by suitable pipes (not shown) to any other suitable source of interior or outside air as may be found most desirable. As best indicated in Fig. 3, the discharge end of the fan 190 is connected with a duct 196 which extends to a point adjacent the bottom of the drum 22 where it connects with a substantially semi-cylindrical sheet metal deflector 198 which extends around the forward side of the drum 22 in slightly spaced relation with respect thereto. By the above described means a suitable volume of air may be directed over a relatively large exposed area of the outer surface of the gelatin sheet being formed on the drum 22 thereby to cause the same to be skin hardened on its exterior surface to the extent desired.

In order to maintain the opposite side of the gelatin sheet being formed on the drum 22 in a more or less tacky condition, the drum 22 is formed for the circulation of water through it as previously described and this water is maintained at a suitable temperature which in some cases at least may be in the neighborhood of 95 to 105° F. so as to prevent hardening of the inner surface of the sheet of gelatin and thus maintain it in the desired tacky condition. In order to maintain the water in the drum 22 at the desired temperature, a water tank 200 is mounted in the base of the machine between the channels 40, as best indicated in Fig. 3. As indicated best in Figs. 1, 2 and 3, a water pump 202 secured upon the lower end of an electric motor 204 is suitably mounted at the discharge end of the machine by means of brackets 206. The intake side of the pump 102 is connected by means of a pipe 208 with the interior of the tank 200 and the discharge side of the pump 202 is connected by means of a pipe line 210 with the fitting 76 at one end of the drum shaft 50. The discharge pipes 68 for the drum 22 are connected into the tank 200 so as to discharge their contents thereinto. An electrical heating element 212 is projected through the rear end wall of the tank 200 into the water within the tank as best indicated in Fig. 3 and a thermostat 214 is also projected through such wall into the interior of the tank as indicated in Fig. 1. Leads from the heating element 212 and thermostat 214 extend to a control box 216 mounted on top of the machine adjacent the control box 118 previously described. The control box 216 is of a conventional adjustable type whereby the flow of electrical current to the heating element 212 may be controlled under the influence of the thermostat 214 to maintain the water in the tank 200 at the desired temperature. This water, in being circulated through the drum 22, will, of course, maintain the drum at the desired temperature necessary to maintain the inner surface of the gelatin sheet being formed on the drum in the desired tacky condition.

As perhaps best illustrated in Figs. 3 and 4, the support 44 for the rolls 26, 28 and 36 and other parts of the machine not heretofore specifically described first extends upwardly from the channels 40 as laterally spaced posts 220 forming a passageway between them for the duct 196 and are joined thereabove to provide a horizontal relatively flat supporting surface 222 bordered at each side by a pair of laterally spaced walls 224 in which the shafts 226, 228 and 236 for the rolls 26, 28 and 36, respectively, as suitably rotatably mounted, as indicated in Fig. 4, in axially parallel relationship, it being understood that the various rolls and particularly the rolls 26, 28 and 36 are fixed for equal rotation with the corresponding shafts. The roll 38 is provided with a shaft 238 carried by rearwardly extending arms 239 secured to the rear faces of the walls 224. Suitable adjustment is provided for the spacing of the shafts 236 and 238 to adjust the tension of the belt 34. Corresponding ends of the shafts 226, 228 and 236 each have fixed thereto a sprocket wheel 240, as best shown in Fig. 9, the sprocket wheels 240 being drivingly connected together for common movement by means of a driving chain 242 trained over them, idler sprockets 243 preferably being provided intermediate each pair of gears 240 so as to insure a greater degree of wrap around the intermediate gear 240 secured to the shaft 228 than would otherwise occur.

As indicated best in Figs. 8 and 9, the chain 242 is trained over a driving sprocket 244 carried by a conventional form of gear reduction mechanism 246, corresponding with the gear reduction mechanism 90 previously described, and in turn driven by a pulley 248 which has a cylindrical outer surface. The pulley 248 is connected by a so-called V-belt 250 with the pulley 252 on a driving motor 254, the belt 250 having a flat side for engagement with the pulley 248 and beveled sides for engagement with the beveled sides of the groove in the pulley 252. The gear reduction mechanism 246 and motor 254 are mounted upon a longitudinally extending plate 256 carried by a bracket 258 formed upon the corresponding side pillar 220 of the support 44. The motor 254 is carried by a slide 260 longitudinally slidable upon the plate 256. The position of the slide 260 and consequently the motor 254 longitudinally of the plate 256 is controlled in the following manner: A bar 262 is suitably secured to the motor 254 and extends therefrom to a point adjacent the opposite end of the plate 260 and at such end one side thereof is formed to present a rack 264. The rack 264 meshes with a pinion 266 fixed upon the vertical shaft of a suitable gear reduction mechanism 268 mounted upon the lower face of the plate 256 and having a suitable manually operable handle 270. From the above description it will be appreciated that by rotating the handle 270 the pinion 266 may be rotated and by rotating will act through the rack 264 to move the bar 262 and consequently the motor 254 longitudinally of the plate 256 and relative to the gear reduction mechanism 246.

As indicated best in Fig. 8, the pulley 252 is of a centrally split type, both halves of which are caused to turn with each other, but the outer half 272 of which is axially movable with respect to the remaining half and is constantly urged towards such other half by means of a coil spring 274. When tension on the driving belt 250 is increased as by operating the handle 270 to move the motor 254 away from the gear reduction mechanism 246, the wedging effect of the belt 250 between the two halves of the pulley 252 cause separation of such two halves and permits the belt 250 to ride on an effectively smaller diameter of the pulley 252. It will be appreciated that in thus reducing the effective diameter of the pulley 252, the ratio of movement between the motor 254 and the sprockets 240 will be increased. In a similar manner, if the tension on the belt 250 is decreased as by suitably operating the handle 270 to draw the motor 254 closer to the gear reduction mechanism 246, the half 272 of the pulley 252 will be urged by the spring 274 into closer relationship with respect to the fixed half of the pulley and will cause the belt 250 to ride further out on the pulley 252, thus having the effect of increasing the diameter of the pulley 252 and to decrease the relative ratio of rotation between the motor 254 and the various sprockets 240. Thus by suitably operating the handle 270 the various rollers 26, 28 and 36 may be caused to increase or decrease in speed to obtain minute adjustments in speed of rotation thereof.

It might also be noted at this point that the mechanism for driving the drum 22, including the gear reduction mechanism 90, belt 94 and motor 96 previously described, includes a substantially identical mechanism for varying the speed of the drum 22 with respect to its driving motor 96, including a control handle 95 so that the relative speeds of both the drum 22 and the rolls 26, 28 and 36 may be accurately controlled to obtain any slight variation in their relative surface speed as may be required in service to take up any slack that might develop in the gelatin ribbon or for other purposes. The above described speed control mechanism is conventional and forms no part of the present invention except as it exists in combination with and varies the speed of operation of other parts of the machine described.

Referring now particularly to Figs. 10 and 11, it is to be noted that the garter springs 30 trained over the rolls 26 and 28 and forming a belt for carrying the sheets or ribbons of gelatin from the drum 22 over the roll 26 and to the roll 28, are relatively widely spaced axially of these rolls. In line with the desired location of each of the belts 30, the rolls 26 are peripherally grooved as indicated at 272 in Fig. 11, the depth of the grooves 272 being such that the outer surfaces of the garter springs 30 lie in substantially flush relationship with respect to the peripheral surface of the rolls 26 and 28 when received in such grooves. Additionally, the surface of the roll 26 is provided with a plurality of preferably equally axially spaced smaller grooves 274, the main purpose of which is to reduce the area of contact between the roll 26 and the cooperating surface of the gelatin sheet or ribbon which passes over it. The reason for setting the garter springs 30 into the surfaces of the rolls 26 and 28 is to provide a substantially laterally continuous support for the gelatin sheets or ribbons passing over them as well as, in the case of the roll 28, to permit employment of the particular type of severing mechanism to be later described where such mechanism is desired.

As indicated best in Figs. 3 and 4, an open top pan 276 is supported upon the surface 222 of the member 44 and is of such size and shape that the lower portions of the rolls 26, 28 and 36 are projected thereinto. The pan 276 is adapted to contain a quantity of liquid, preferably an oil and preferably a light mineral oil so that the rolls 26, 28 and 36 in dipping into such oil, as well as the garter springs 30 and belt 34, will be coated with the same so that the skin hardened side of the gelatin sheet or ribbon in contacting these rolls and belt, and later contacting other objects, as for instance forming dies, will be relieved of any tendency to stick to these parts. In order that the bath of oil in the pan 276 will not have a chilling effect on the gelatin sheet or ribbon passing over the rolls 26, 28 and belt 34 and so as to maintain the upper surface of the gelatin sheet or ribbon in a more or less tacky state while passing over these parts, means are provided for heating the oil in the pan 276. For this purpose the pan 276 is provided with a double bottom forming a chamber 278 therein as best indicated in Figs. 1 and 2, A pipe 280 connected into the discharge pipe 210 for the pump 202 extends through the bottom of the pan 276 into the chamber 278, and a discharge pipe 282 connected with the interior of the chamber 278 leads to the suction pipe 208 for the pump 202, so that upon operation of the motor 204 and pump 202 the heated water or other liquid in the tank 200 is not only caused to circulate through the drum 22, as previously described, but is also caused to circulate through the chamber 278 in the bottom of the pan 276 and in this manner maintain the oil in the pan 276 at a desired temperature. In order to insure proper circulation of this heating fluid through the chamber 278, a baffle 284, as shown in Fig. 3, is preferably positioned centrally of the chamber 278 and extends from one end thereof to a point adjacent the opposite end thereof. The inlet pipe 280 connects into the chamber 278 on one side of this baffle and the discharge pipe 282 connects into the chamber on the opposite side of the same, thus insuring that the water flowing into the chamber 278 must flow for substantially the full length of the chamber in both directions before it is discharged therefrom.

Where it is desired to cut the gelatin ribbons formed on the drum 24 into sheets of predetermined length, the following mechanism is preferably provided. Upon the upper face of the side walls 224 of the support 44 a vertically extending standard 286 is rigidly fixed as by bolts or the like. Each standard 286 is provided with a vertically disposed slot 288 therethrough which forms a guideway for a journal box 290 received therein. Each journal box 290 is vertically adjustable in its corresponding guideway 288 by means of a rotatable screw 292 fixed against axial movement relative thereto and threaded upwardly through the corresponding standard 286 at the upper end of the slot 288, a lock nut 294 being provided for each screw 292 in order to lock the same in vertically adjusted position.

Rotatably mounted in the journal boxes 290 is a shaft 296 having fixed to one of its ends a gear 298. The shaft 228 for the roll 28 is extended axially on the same side of the machine as the gear 298 and has fixed thereto a gear 300 which meshes with the gear 298 and consequently drives the shaft 296.

The knife blade or shear 32 is secured to the shaft 296 for equal rotation therewith between the standards 286 by means of a pair of semi-circular clamping members 302 having radially directed flanges 304 at the opposite margins thereof through which bolts 306 are extended, the knife blade being interposed between opposed flanges 304 on the opposite members 302 and the corresponding bolts 306 being extended through the knife blade 32 as indicated in Fig. 3. By this means the knife blade 32 is firmly clamped to the shaft 296 for equal rotation therewith.

The blade 32 is so adjusted with respect to the surface of the roll 28 that it substantially contacts the surface of the roll 28 each time it is rotated thereby to cause the ribbon or gelatin passing over the roll 28 to be transversely severed thereby. It will be noted that, because of the groove 272 formed in the surface of the roll 28 for reception of the garter springs 30, the knife blade 32 will not sever that portion of the gelatin ribbon over the grooves 272, and consequently the ribbon will not be completely severed into sheets, but each sheet thus severed will be connected to its adjacent sheet by a plurality of relatively small tongues corresponding to the width and spacing of the grooves 272 as indicated at 307 in Fig. 12 in which the gelatin ribbon is indicated generally at 308 and the individual sheets at 309. The purpose for providing this partial severance only of the gelatin ribbon into sheets is so that the connecting tongues 307 will serve to draw the advanced edge of each sheet 309 up onto the belt 34 during operation of the machine and to eliminate the possibility of any sheet from following around the periphery of the roll 28.

It may be preferable in some cases to operate the belt 34 at a slightly higher surface speed than the rolls 26 and 28 so as to cause a stretching of the tongues 307 connecting adjacent ends of adjacent sheets 309 and thus separate the sheets 309 from one another over the area of severance between them. This may be desirable particularly in some cases in order to prevent any possible re-welding of the severed edges of the sheets 309 once they have been severed and also to facilitate the tearing of one sheet from another at the discharge end of the machine. It will be appreciated that the surface speed of the belt 34 may be made slightly greater than the surface speeds of the rolls 26 and 28 either by making the roll 36 of slightly larger diameter than the rolls 26 and 28, or else by making the sprocket 240 of the shaft 236 slightly smaller in diameter than the sprockets 240 on the shafts 226 and 228.

It will also be appreciated that the length of the sheets 309 severed from the gelatin ribbon 308 may be varied as desired by varying the ratio between the gears 298 and 300 so as to drive the shaft 296 and consequently the knife 32 at a multiple or division, or part thereof, of the speed of rotation of the rolls 26 and 28.

Switches indicated at 310 in Figs. 1, 2 and 3 for controlling energization of the various motors and electrical heating elements provided in the machine may be grouped in a suitable mounting and supported on top of the standards 286 as indicated, if desired, the particular mounting thus shown for the switches also serving as a support for the control boxes 118 and 216 for the electrical heating element 112 and 212, respectively. It will also be appreciated that suitable shields such as 312 may be provided over certain driving parts of the machine in order to protect the operators of the machine from possible injury by contact therewith.

Formal changes may be made in the specific embodiment of the invention described without departing from the spirit and substance of the invention, the scope of which is commensurate with the appended claims.

What is claimed is:

1. In the manufacture of gelatin sheets by spreading a thin layer of heated gelatin upon the surface of a revolving drum, the steps of cooling and drying the outer exposed surface of said layer by forcefully flowing air at a temperature not substantially greater than atmospheric temperature over said outer surface, and simultaneously maintaining the surface of said drum materially above atmospheric temperature, whereby the outer surface of said layer will be hardened and the inner surface thereof in contact with said drum will be maintained in tacky condition.

2. In the manufacture of gelatin or the like sheets by feeding a mass of heated gelatin in strip-like form upon the surface of a movable member, the steps of cooling the exposed face of said strip while on said member by flowing air at a lower temperature than said gelatin thereover and maintaining the opposite face therof at an elevated temperature whereby to harden said exposed face and maintain said opposite face in tacky condition, stripping said strip from said member, partially severing said strip at predetermined intervals in the length thereof to form connected sheets, and placing said strip under longitudinal stress after said partial severance whereby to stretch the unsevered portions between said sheets and separate said sheets transversely of the lines of partial severance between them.

3. In the manufacture of gelatin sheets by discharging a layer of heated gelatin upon a moving surface, the steps of cooling one surface of said layer by flowing air at a lower temperature than said gelatin thereover and maintaining the opposite surface thereof at a temperature materially above room temperature, whereby the resulting sheet will have one surface relatively hard and the opposite surface relatively tacky, stripping said layer from said drum, acting upon said layer to completely sever it at intervals only over the width thereof at predetermined points in the length thereof whereby to form connected sheets therefrom, and simultaneously with said severing placing the connected portions between the sheet being severed and the unsevered portion of the layer under tension longitudinally of said layer whereby to stretch said connected portions.

4. In the manufacture of gelatin sheets by discharging a layer of heated gelatin upon a moving surface, the steps of cooling one surface of said layer by flowing air at a lower temperature than said gelatin thereover and maintaining the opposite surface thereof at a temperature materially above room temperature, whereby the resulting sheet will have one surface relatively hard and the opposite surface relatively tacky, stripping said layer from said drum, maintaining said layer at a temperature above room temperature whereby to maintain said opposite surface in its tacky condition and acting upon said layer to completely sever it at intervals only over the width thereof at predetermined points in the length thereof whereby to form connected sheets therefrom, and simultaneously with said severing placing the connected portions between the sheet being severed and the unsevered portion of the layer under tension longitudinally of said layer whereby to stretch said connected portions.

ALFRED W. KATH.